(12) United States Patent
Wu et al.

(10) Patent No.: US 12,677,247 B2
(45) Date of Patent: Jul. 7, 2026

(54) MOBILITY MEASUREMENT METHOD AND APPARATUS

(71) Applicant: HUAWEI TECHNOLOGIES CO., LTD., Shenzhen (CN)

(72) Inventors: Yedan Wu, Shanghai (CN); Tingting Geng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 637 days.

(21) Appl. No.: 18/163,565

(22) Filed: Feb. 2, 2023

(65) Prior Publication Data

US 2023/0189203 A1 Jun. 15, 2023

Related U.S. Application Data

(63) Continuation of application No. PCT/CN2020/122415, filed on Oct. 21, 2020.

(30) Foreign Application Priority Data

Aug. 5, 2020 (WO) ................ PCT/CN2020/107218

(51) Int. Cl.
*H04W 64/00* (2009.01)
*H04W 8/02* (2009.01)

(52) U.S. Cl.
CPC ........... *H04W 64/006* (2013.01); *H04W 8/02* (2013.01)

(58) Field of Classification Search
CPC ......... H04W 4/14; H04W 8/18; H04W 60/00; H04W 8/08; H04W 88/06
See application file for complete search history.

(56) References Cited

U.S. PATENT DOCUMENTS

2014/0162633 A1 6/2014 Hwang et al.
2021/0037403 A1* 2/2021 Kim ...................... H04W 24/10

FOREIGN PATENT DOCUMENTS

| CN | 101730135 A | 6/2010 |
| CN | 104581809 A | 4/2015 |
| CN | 109792623 A | 5/2019 |
| CN | 109803280 A | 5/2019 |

(Continued)

OTHER PUBLICATIONS

Huawei, HiSilicon, "Discussion on cell measurement for mobility management in NTN," 3GPP TSG RAN WGI Meeting #97, Reno, USA, May 13-17, 2019, RI-1905999; 4 total pages.

(Continued)

*Primary Examiner* — Marisol Figueroa
(74) *Attorney, Agent, or Firm* — Rimon PC

(57) ABSTRACT

This application provides a mobility measurement method and an apparatus, to help resolve a problem of validity of mobility measurement of a terminal device in a conventional technology. The method includes that a network device sends a message to a terminal device, where the message includes a plurality of sets of measurement configuration information. The method further includes that the terminal device uses one of a plurality of sets of measurement configurations from the network device for mobility measurement based on a current location and/or a current time. According to the method, validity of mobility measurement is improved, and improves the terminal device to obtain a good service.

12 Claims, 3 Drawing Sheets

Network device                Terminal device

301: Send a plurality of sets of measurement configuration information

302: Use one of the received plurality of sets of measurement configuration information for mobility measurement

(56)　　　　　References Cited

FOREIGN PATENT DOCUMENTS

| CN | 111436060 A | 7/2020 | |
| EP | 2854441 A1 * | 4/2015 | .......... H04L 1/0026 |
| WO | 2019170866 A1 | 9/2019 | |

OTHER PUBLICATIONS

NEC, Huawei, HiSilicon, ZTE Corporation, Sanechips, "TP on service continuity between NTN and TN," 3GPP TSG-RAN WG2 Meeting #108, Reno, USA, Nov. 18-22, 2019, R2-1916387; 6 total pages.

InterDigital, "Conditional measurement configuration for LEO NTN.," 3GPP RAN WG2 Meeting #107bis, Chongqing, China, Oct. 14-18, 2019, R2-1913603, 2 pages.

3GPP TS 38.304 V16.1.0 (Jul. 2020), 3rd Generation Partnership Project; Technical Specification Group Radio Access Network; NR; User Equipment (UE) procedures in Idle mode and RRC, Inactive state (Release 16), 39 pages.

CATT, "Summary #2 of UE and gNB measurements for NR Positioning," 3GPP TSG RAN WG1 #99, Reno, Nevada, USA, Nov. 18-22, 2019, R1-1912147, 25 pages.

3GPP TS 38.331 V16.1.0 (Jul. 2020), 3rd Generation Partnership Project; Technical Specification Group Radio Access Network; NR; Radio Resource Control (RRC) protocol specification (Release 16), 906 pages.

3GPP TR 38.821 V16.0.0 (Dec. 2019), 3rd Generation Partnership Project; Technical Specification Group Radio Access Network; Solutions for NR to support non-terrestrial networks (NTN) (Release 16), 140 pages.

3GPP TR 23.737 V17.1.0 (Jul. 2020), 3rd Generation Partnership Project; Technical Specification Group Services and System Aspects; Study on architecture aspects for using satellite access in 5G (Release 17), 92 pages.

* cited by examiner

1

MOBILITY MEASUREMENT METHOD AND APPARATUS

CROSS-REFERENCE TO RELATED APPLICATIONS

This application is a continuation of International Application No. PCT/CN2020/122415, filed on Oct. 21, 2020, which claims priority to International Application No. PCT/CN2020/107218, filed on Aug. 5, 2020. The disclosures of the aforementioned applications are hereby incorporated by reference in their entireties.

TECHNICAL FIELD

This application generally relates to the field of wireless communication technologies, and in particular, to a mobility measurement method and an apparatus.

BACKGROUND

Mobility management is an important part of wireless communication. A main purpose of mobility management is to ensure that a communication link between a network device and a terminal device is not interrupted by movement of the terminal device. Mobility management includes terminal device radio resource control (RRC) idle state (RRC_IDLE state) mobility management and terminal device RRC connected state (RRC_CONNECTED state) mobility management. Mobility management is performed based on a measurement result. Therefore, how to effectively perform mobility measurement to enable a terminal device to obtain a good service is an urgent problem to be resolved.

SUMMARY

Embodiments of this application provide a mobility measurement method and an apparatus.

According to a first aspect, an embodiment of this application provides a mobility measurement method. The method is performed by a terminal device or a module in a terminal device. That the method is performed by the terminal device is used as an example for description herein. The terminal device receives a message from a network device, where the message includes a plurality of sets of measurement configuration information. The terminal device uses one of the plurality of sets of measurement configuration information for mobility measurement based on a current location and/or a current time.

According to the foregoing methods, the terminal device can flexibly select, based on a terrestrial network deployment, appropriate measurement configuration information to perform mobility measurement. Therefore, validity of mobility measurement is improved, and this helps the terminal device obtain a good service.

In a possible implementation of the first aspect, the mobility measurement indicates a measurement process and a process of processing a measurement result.

In a possible implementation of the first aspect, the plurality of sets of measurement configuration information may be explicit. For example, the terminal device receives the plurality of sets of measurement configuration information sent by the network device, including a measurement configuration 1 and a measurement configuration 2. This helps save resources of the terminal device. The plurality of sets of measurement configuration information may be implicit. The terminal device receives one set of measurement configuration information sent by the network device, where the measurement configuration information includes a measurement configuration parameter used for reference and a change rule of the measurement configuration parameter. Alternatively, the terminal device receives one set of measurement configuration information sent by the network device, where the measurement configuration information includes a measurement configuration parameter used for reference. The change rule of the measurement configuration parameter is preset on a terminal device side. The terminal device calculates, based on the measurement configuration parameter used for reference and the change rule of the measurement configuration parameter, a measurement configuration parameter required by the terminal device, and uses the measurement configuration parameter for mobility measurement.

In a possible implementation of the first aspect, each of the plurality of sets of measurement configuration information includes at least one of the following parameters: location information or time information.

In a possible implementation of the first aspect, the location information is used to compare with a current location of the terminal device, and a representation form of the location information may be an absolute location, for example, global positioning system (GPS) information, longitude and latitude information, or may be a relative location, for example, a distance from a cell center.

In a possible implementation of the first aspect, the time information is used to compare with a current time of the terminal device, and a representation form of the time information may be an absolute time, for example, a universal standard time, or may be a relative time.

In a possible implementation of the first aspect, the location information of the measurement configuration information used for mobility measurement matches the current location of the terminal device. The matching indicates that the current location of the terminal device is within a specific range of the location information (optionally, boundary values are included or not included). Optionally, the range is from the measurement configuration information sent by the network device. Optionally, the range is preset in advance on the terminal device side. For example, when the location information is 3° north latitude and 5° east longitude, and a current location of the terminal device is between 1° and 5° north latitude (boundary values are included) and 2° and 9° east longitude (boundary values are included), it may be considered that the location information matches the current location of the terminal device.

In a possible implementation of the first aspect, the time information of the measurement configuration information used for mobility measurement matches the current time of the terminal device. The matching indicates that the current time of the terminal device is within a specific range of the time information (optionally, boundary values are included or not included). Optionally, the range is from the measurement configuration information sent by the network device. Optionally, the range is preset in advance on the terminal device side. For example, the time information is 05:00 Beijing time. When the current time of the terminal device is 04:58 to 05:03 Beijing time, it may be considered that the time information matches the current time of the terminal device.

According to the foregoing implementation methods, the terminal device may select, based on a current location and/or a current time, a set of appropriate measurement configuration information for mobility measurement. This improves validity of mobility measurement, and helps the terminal device obtain a good service.

In a possible implementation of the first aspect, the terminal device uses a set of general measurement configuration information for mobility measurement. A scenario in which the terminal device selects the general measurement configuration information is at least one of the following: the location information of the plurality of sets of measurement configuration information does not match the current location of the terminal device: the time information of the plurality of sets of measurement configuration information does not match the current time of the terminal device: the terminal device does not have or loses a positioning function; or the terminal device does not have or loses a time function.

According to the foregoing implementation method, the terminal device selects a set of general measurement configuration information, to compensate a scenario in which the terminal device cannot select measurement configuration information for mobile measurement based on the current location and/or the current time.

In a possible implementation of the first aspect, each of the plurality of sets of measurement configuration information further includes frequency information. It may be understood that because there are a plurality of sets of measurement configuration information, there are also a plurality of sets of frequency information. The frequency information indicates a frequency and a priority corresponding to the frequency. In each set of frequency information, a quantity of frequencies is not limited, and types of the frequencies are also not limited. For example, the frequencies may be terrestrial network (TN) frequencies or non-terrestrial network (NTN) frequencies. The frequency may indicate a frequency band, a center frequency (e.g., frequency point) of the frequency band, or indicate a number of the center frequency (e.g., frequency point). For example, the frequency may indicate a frequency band 890.1 MHz to 890.3 MHz, a center frequency 890.2 MHz, or a frequency number 1.

In a possible implementation, one priority in one set of frequency information may correspond to one frequency: one priority in one set of frequency information may correspond to a plurality of frequencies; or one frequency may have no corresponding priority. For example, in a set of frequency information, a frequency A corresponds to priority 5, a frequency B corresponds to priority 5, a frequency C corresponds to priority 4, and a frequency D has no corresponding priority.

In a possible implementation, priorities corresponding to a same frequency in a plurality of sets of frequency information may be different. For example, in frequency information 1, a frequency A corresponds to priority 5: but in frequency information 2, the frequency A corresponds to priority 6. Priorities corresponding to different frequencies in the plurality of sets of frequency information may be the same. For example, in the frequency information 1, the frequency A corresponds to priority 5; and in the frequency information 2, a frequency B corresponds to priority 5.

In a possible implementation of the first aspect, the frequency information is associated with the location information. The terminal device selects, based on the current location, one of the plurality of sets of frequency information sent by the network device for mobility measurement. For example, a current location 1 of the terminal device is covered by a TN frequency, and the terminal device selects the frequency information 1, where location information corresponding to the frequency information 1 matches the current location 1 of the terminal device. The frequency information 1 includes: the TN frequency, where the TN frequency corresponds to priority 7; and an NTN frequency, where the NTN frequency corresponds to priority 2. A current location 2 of the terminal device is not covered by the TN frequency, and the frequency information 2 is selected, where location information corresponding to the frequency information 2 matches the current location 2 of the terminal device. The frequency information 2 includes: the TN frequency, where the TN frequency corresponds to priority 1; and an NTN frequency, where the NTN frequency corresponds to priority 6.

In the foregoing implementation, because network deployment is related to a location, the terminal device selects a set of frequency information based on the current location to perform mobility measurement. Compared with the conventional technology in which one set of frequency information is always used, advantages are obvious. Energy consumption of the terminal device is reduced and a cell with good quality is quickly measured, thereby facilitating the terminal device to obtain a good service.

In a possible implementation of the first aspect, the frequency information is associated with the time information. The terminal device selects, based on the current time, one of the plurality of sets of frequency information sent by the network device for mobility measurement. For example, at a current time 1 of the terminal device, coverage of the TN frequency exists, and the terminal device selects the frequency information 1, where time information corresponding to the frequency information 1 matches the current time 1 of the terminal device. The frequency information 1 includes: the TN frequency, where the TN frequency corresponds to priority 7; and the NTN frequency, where the NTN frequency corresponds to priority 2. At a current time 2 of the terminal device, coverage of the TN frequency does not exist, and the frequency information 2 is selected, where time information corresponding to the frequency information 2 matches the current time 2 of the terminal device. The frequency information 2 includes: the TN frequency, where the TN frequency corresponds to priority 1; and the NTN frequency, where the NTN frequency corresponds to priority 6.

In the foregoing implementation, because network deployment is related to time, the terminal device selects a set of frequency information based on the current time to perform mobility measurement. Compared with the conventional technology in which one set of frequency information is always used, advantages are obvious. Energy consumption of the terminal device is reduced and a cell with good quality is quickly measured, thereby facilitating the terminal device to obtain a good service.

In a possible implementation of the first aspect, the terminal device may use one of the plurality of sets of frequency information for mobility measurement based on a current location and a current time. Location information corresponding to the set of frequency information matches the current location of the terminal device, and time information corresponding to the set of frequency information matches the current time of the terminal device. To be specific, the current location of the terminal device is within a range of the location information, and the current time of the terminal device is within a range of the time information.

In a possible implementation of the first aspect, the terminal device selects one set of general frequency information for mobility measurement. A scenario in which the terminal device selects the general frequency information is at least one of the following: location information associated with the plurality of sets of frequency information does not match the current location of the terminal device; time information associated with the plurality of sets of frequency information does not match the current time of the terminal device: the terminal device does not have or loses a positioning function; and the terminal device does not have or loses a time function.

According to the foregoing implementation method, the terminal device selects one set of general frequency information, to compensate a scenario in which the terminal device cannot select frequency information for mobile measurement based on a current location and/or a current time.

In a possible implementation of the first aspect, each of the plurality of sets of measurement configuration information includes an offset. The offset is used by the terminal device to correct the mobility measurement result. For example, the terminal device corrects a received signal level value that is obtained through measurement. It may be understood that because there are a plurality of sets of measurement configuration information, there are a plurality of sets of offsets.

In a possible implementation of the first aspect, the offset is associated with the location information. The plurality of sets of offsets may be explicit, and the terminal device may select different offsets at different current locations. For example, in a current location 1 of the terminal device, an offset 1 is selected, and location information corresponding to the offset 1 matches the current location 1 of the terminal device; and in a current location 2 of the terminal device, an offset 2 is selected, and location information corresponding to the offset 2 matches the current location 2 of the terminal device. This helps save the resources of the terminal device. The plurality of sets of offsets may be implicit. For example, the terminal device receives reference offsets from the network device, location information of the reference offsets, and a relationship between an offset and a distance. Alternatively, the terminal device receives reference offsets from the network device and location information corresponding to the reference offsets (a relationship between an offset and a distance is preset on the terminal device side). The distance refers to a physical distance, for example, between a current location of the terminal device and the location information corresponding to the reference offsets. An actual offset used by the terminal device is calculated based on the current location by using the reference offset, the distance, and a relationship between the offset and the distance. This helps save resources of the network device.

In a possible implementation of the first aspect, the offset is associated with the time information. The plurality of sets of offsets may be explicit, and the terminal device may select different offsets at different current times. For example, at a current time 1 of the terminal device, an offset 1 is selected, and the current time 1 is within a time information range associated with the offset 1; and at a current time 2 of the terminal device, an offset 2 is selected, and time information corresponding to the offset 2 matches the current time 2 of the terminal device. This helps save the resources of the terminal device. The plurality of sets of offsets may be implicit. For example, the terminal device receives a reference offset from the network device, time information corresponding to the reference offset, and a relationship between the offset and a time interval. Alternatively, the terminal device receives a reference offset from the network device and time information corresponding to the reference offset (a relationship between the offset and a time interval is preset on the terminal device side). The time interval refers to an interval between a current time of the terminal device and time information corresponding to the reference offset. An actual offset used by the terminal device is calculated based on the current time by using the reference offset, the time interval, and the relationship between the offset and the time interval. This helps save the resources of the terminal device.

In a possible implementation of the first aspect, the terminal device may use one of the plurality of sets of offsets for mobility measurement based on a current location and a current time. Location information corresponding to the set of offsets matches the current location of the terminal device, and time information corresponding to the set of offsets matches the current time of the terminal device. To be specific, the current location of the terminal device is within a range of location information, and the current time of the terminal device is within a range of time information.

In a possible implementation of the first aspect, the terminal device selects one set of general offsets for mobility measurement. A scenario in which the terminal device selects the general offset is at least one of the following: location information associated with the plurality of sets of offsets does not match a current location of the terminal device; time information associated with the plurality of sets of offsets does not match the current time of the terminal device: the terminal device does not have or loses a positioning function; or the terminal device does not have or loses a time function.

In the foregoing implementations, the terminal device may correct a mobility measurement result based on network deployment, thereby improving rationality of correction and facilitating the terminal device to obtain a good service.

In a possible implementation of the first aspect, measurement configuration information received by the terminal device in a radio resource control (RRC) idle state or an RRC deactivated state may be sent by using a system message or an RRC release message.

In a possible implementation of the first aspect, measurement configuration information received by the terminal device in an RRC connected state is included in an RRC reconfiguration message sent by the network device.

By implementing the method described in the first aspect, the terminal device may select one set of measurement configuration information that matches a current location and/or a current time for mobility measurement. In this manner, validity of mobility measurement is improved, and this helps the terminal device obtain a good service.

According to a second aspect, an embodiment of this application provides a mobility measurement method. The method is performed by a network device or a module in a network device. That the method is performed by the network device is used as an example for description herein. The network device sends a message to a terminal device, where the message includes a plurality of sets of measurement configuration information, and one of the plurality of sets of measurement configuration information is used for mobility measurement of the terminal device.

In a possible implementation of the second aspect, the plurality of sets of measurement configuration information may be explicit. For example, the network device sends a plurality of sets of measurement configuration information, including a measurement configuration 1 and a measurement configuration 2. This helps save resources of the terminal device. The plurality of sets of measurement configuration information may be implicit. For example, the network device sends one set of measurement configuration information, and the measurement configuration information includes a measurement configuration parameter used for reference, and a change rule of the measurement configuration parameter. Alternatively, the network device sends one set of measurement configuration information, and the measurement configuration information includes a measurement configuration parameter used for reference, and a change rule of the measurement configuration parameter is preset on a terminal device side.

In a possible implementation of the second aspect, each of the plurality of sets of measurement configuration information includes at least one of the following parameters: location information or time information.

In a possible implementation of the second aspect, the location information is used to compare with a current location of the terminal device, and a representation form of the location information may be an absolute location, for example, GPS information or latitude and longitude information, or may be a relative location, for example, a distance from a cell center.

In a possible implementation of the second aspect, the time information is used to compare with a current time of the terminal device, and a representation form of the time information may be an absolute time, for example, a universal standard time, or may be a relative time.

In a possible implementation of the second aspect, the plurality of sets of measurement configuration information include one set of general measurement configuration information, and the general measurement configuration information is applied to at least one of the following scenarios: location information of the plurality of sets of measurement configuration information does not match a current location of the terminal device; time information of the plurality of sets of measurement configuration information does not match a current time of the terminal device: the terminal device does not have or loses a positioning function; or the terminal device does not have or loses a time function.

In a possible implementation of the second aspect, each of the plurality of sets of measurement configuration information may further include frequency information. It may be understood that because there are a plurality of sets of measurement configuration information, there are a plurality of sets of frequency information. The frequency information indicates a frequency and a priority corresponding to the frequency. A quantity of frequencies in each set of frequency information is not limited, and a frequency type is not limited, for example, a TN frequency or an NTN frequency. The frequency may indicate a frequency band, a center frequency of the frequency band, or a number of the center frequency. For example, the frequency may indicate a frequency band 890.1 MHz to 890.3 MHz, a center frequency 890.2 MHz, or a frequency number 1.

In a possible implementation of the second aspect, one priority in one set of frequency information may correspond to one frequency: one priority in one set of frequency information may correspond to a plurality of frequencies; or one frequency may have no corresponding priority. For example, in a set of frequency information, a frequency A corresponds to priority 5, a frequency B corresponds to priority 5, a frequency C corresponds to priority 4, and a frequency D has no corresponding priority.

In a possible implementation of the second aspect, priorities corresponding to same frequencies in a plurality of sets of frequency information may be different. For example, in frequency information 1, a frequency A corresponds to priority 5; and in frequency information 2, the frequency A corresponds to priority 6. Priorities corresponding to different frequencies in the plurality of sets of frequency information may be the same. For example, in the frequency information 1, the frequency A corresponds to priority 5; and in the frequency information 2, a frequency B corresponds to priority 5.

In a possible implementation of the second aspect, the frequency information is associated with the location information. In a plurality of sets of frequency information sent by the network device, frequency information corresponding to different location information may be different. For example, in frequency information corresponding to location information 1 a frequency A corresponds to priority 7, and a frequency B corresponds to priority 5; and in frequency information corresponding to location information 2, a frequency A corresponds to priority 4, a frequency B corresponds to priority 5, and a frequency C corresponds to priority 7.

In a possible implementation of the second aspect, the frequency information is associated with the time information. In the plurality of sets of frequency information sent by the network device, frequency information corresponding to different time information may be different. For example, in frequency information corresponding to time information 1, a frequency A corresponds to priority 7 and a frequency B corresponds to priority 5; and in frequency information corresponding to time information 2, a frequency A corresponds to priority 4, a frequency B corresponds to priority 5, and a frequency C corresponds to priority 7.

In a possible implementation of the second aspect, the plurality of sets of offsets include a set of general frequency information, and the general frequency information is applied to at least one of the following scenarios: location information associated with the plurality of sets of frequency information does not match a current location of the terminal device; time information associated with the plurality of sets of frequency information does not match a current time of the terminal device: the terminal device does not have or loses a positioning function; or the terminal device does not have or loses a time function.

In a possible implementation of the second aspect, each of the plurality of sets of measurement configuration information includes an offset, and the offset is used to correct a mobility measurement result of the terminal device, for example, the offset is used to correct a received signal level value measured by the terminal device. It may be understood that because there are a plurality of sets of measurement configuration information, there are a plurality of sets of offsets. The offsets may include a cell offset, a frequency offset, an NTN offset, and the like. The various offsets may be simultaneously used to correct one measurement result.

In a possible implementation of the second aspect, the offsets are associated with the location information. The plurality of offsets may be explicit, and offsets corresponding to different location information may be different. For example, the network device sends location information 1 corresponding to an offset 1, location information 2 corresponding to an offset 2, and location information 3 corresponding to the offset 2. This helps save the resources of the terminal device. The plurality of offsets may be implicit, for example, a reference offset sent by the network device, location information corresponding to the reference offset, and a relationship between an offset and a distance. Alternatively, the network device sends a reference offset and location information corresponding to the reference offset (a relationship between an offset and a distance is preset on the terminal device side). The distance refers to a physical distance, for example, between a current location of the terminal device and location information corresponding to the reference offset.

In a possible implementation of the second aspect, the offsets are associated with the time information. The plurality of offsets may be explicit, and offsets corresponding to different time information may be different. For example, the network device sends time information 1 corresponding to the offset 1, time information 2 corresponding to the offset 2, and time information 3 corresponding to the offset 2. This helps save the resources of the terminal device. The plurality of offsets may be implicit. For example, the terminal device receives a reference offset sent by the network device, time information corresponding to the reference offset, and a relationship between an offset and a time interval. Alternatively, the network device sends a reference offset and time information corresponding to the reference offset (a relationship between an offset and a time interval is preset on the terminal device side). The time interval refers to an interval between a current time and the time information corresponding to the reference offset.

In a possible implementation of the second aspect, the plurality of sets of offsets include a set of general offset, and the general offset is applied to at least one of the following scenarios: location information associated with the plurality of sets of offsets does not match a current location of the terminal device; time information associated with the plurality of sets of offsets does not match the current time of the terminal device: the terminal device does not have or loses a positioning function; or the terminal device does not have or loses a time function.

In a possible implementation of the second aspect, the measurement configuration information may be sent by using a system message or dedicated signaling, and is received by the terminal device in an RRC idle state or an RRC deactivated state.

In a possible implementation of the second aspect, the measurement configuration information is included in an RRC reconfiguration message sent by the network device, and is received by the terminal device in an RRC connected state.

According to a third aspect, an apparatus is provided. The apparatus may be a terminal device, an apparatus in a terminal device, or an apparatus that can be matched with a terminal device for use. In a design, the apparatus includes a module that may perform and is in a one-to-one correspondence with the method/operations/steps/actions described in the first aspect and any possible implementation of the first aspect. The module may be implemented by using a hardware circuit, software, or a combination of a hardware circuit and software. In a design, the apparatus may include a processing module and a communication module.

In a possible design, the apparatus may include a receiving unit (e.g., receiving circuit) and a processing unit (e.g., processing circuit). The receiving unit is configured to receive a message from a network device. The message includes a plurality of sets of measurement configuration information. The processing unit is configured to use one of the plurality of sets of measurement configuration information for mobility measurement based on a current location and/or a current time of the terminal device.

For a method for receiving a message from a network device, refer to corresponding descriptions in the first aspect. Details are not described herein again. For a method for using one of a plurality of sets of measurement configuration information for mobility measurement based on a current location and/or a current time, refer to corresponding descriptions in the first aspect. Details are not described herein again.

According to a fourth aspect, an apparatus is provided. The apparatus may be a network device, an apparatus in a network device, or an apparatus that can be matched with a network device for use. In a design, the apparatus includes a module that may perform and is in a one-to-one correspondence with the method/operations/steps/actions described in the second aspect and any possible implementation of the second aspect. The module may be implemented by using a hardware circuit, software, or a combination of a hardware circuit and software. In a design, the apparatus may include a processing module and a communication module.

In a possible design, the apparatus may include a sending unit (e.g., sending circuit), configured to send a message to a terminal device. The message includes a plurality of sets of measurement configuration information, and one of the plurality of sets of measurement configuration information is used for mobility measurement of the terminal device.

For a method for sending a message to a terminal device, refer to corresponding descriptions in the second aspect. Details are not described herein again.

According to a fifth aspect, an apparatus is provided. The apparatus includes a processor, configured to implement the method described in the first aspect. The apparatus may further include a memory, configured to store instructions and data. The memory is coupled to the processor, and when the processor executes the instructions stored in the memory, the method described in the first aspect can be implemented. The apparatus may further include a communication interface, and the communication interface is used by the apparatus to communicate with another device. For example, the communication interface may be a transceiver, a circuit, a bus, a module, or another type of communication interface; and the another device may be a network device. In a possible device, the apparatus includes: a processor, configured to: use a communication interface to receive a message from a network device, where the message includes a plurality of sets of measurement configuration information; and use one of the plurality of sets of measurement configuration information for mobility measurement based on a current location and/or a current time.

For a method for receiving a message from a network device, refer to corresponding descriptions in the first aspect. Details are not described herein again. For a method for using one of the plurality of sets of measurement configuration information for mobility measurement based on a current location and/or a current time, refer to corresponding descriptions in the first aspect. Details are not described herein again.

According to a sixth aspect, an apparatus is provided. The apparatus includes a processor, configured to implement the method described in the second aspect. The apparatus may further include a memory, configured to store instructions and data. The memory is coupled to the processor, and when the processor executes the instructions stored in the memory, the method described in the second aspect can be implemented. The apparatus may further include a communication interface, and the communication interface is used by the apparatus to communicate with another device. For example, the communication interface may be a transceiver, a circuit, a bus, a module, or another type of communication interface; and the another device may be a terminal device. In a possible device, the apparatus includes: a processor, configured to use the communication interface to send a message to a terminal device, where the message includes a plurality of sets of measurement configuration information, and one of the plurality of sets of measurement configuration information is used for mobility measurement of the terminal device. For a method for sending a message to a terminal device, refer to corresponding descriptions in the second aspect. Details are not described herein again.

According to a seventh aspect, an embodiment of this application provides a computer-readable storage medium. Computer programs or instructions are stored on the computer-readable storage medium, and when the computer programs or the instructions are executed, a computer is enabled to perform the method in the first aspect, the second aspect, any possible design of the first aspect, or any possible design of the second aspect.

According to an eighth aspect, an embodiment of this application provides a computer program product. The computer program product includes computer program code or instructions. When the computer program code or the instructions are run on a computer, the computer is enabled to perform the method in the first aspect, the second aspect, any possible design of the first aspect, or any possible design of the second aspect.

According to a ninth aspect, an embodiment of this application provides a chip, including a processor. The processor is coupled to a memory, and the processor is configured to implement the method in the first aspect, the second aspect, any possible design of the first aspect, or any possible design of the second aspect.

According to a tenth aspect, an embodiment of this application provides a system, including the apparatus according to the third aspect and the apparatus according to the fourth aspect.

According to an eleventh aspect, an embodiment of this application provides a system, including the apparatus according to the fifth aspect and the apparatus according to the sixth aspect.

DESCRIPTION OF EMBODIMENTS

The technical solutions provided in the embodiments of this application may be applied to various communication systems, for example, a long term evolution (LTE) system, a 5th generation (5G) mobile communication system, a non-terrestrial network (NTN) communication system, a future mobile communication system, or a system integrating a plurality of communication systems. This is not limited in the embodiments of this application. The 5G communication system may also be referred to as a new radio (NR) system. For example, the technical solutions provided in the embodiments of this application may be applied to communication scenarios such as a device-to-device (D2D) communication scenario, a machine type communication (MTC) scenario, a vehicle to everything (V2X) communication scenario, a vehicle to vehicle (V2V) communication scenario, an Internet of things (IoT) communication scenario, and a massive machine-type communication (mMTC) scenario.

An NTN refers to a network in which a base station or some base station functions are deployed on a high-altitude platform or a satellite to provide coverage for a terminal device. Satellite communication has significant advantages such as global coverage, long-distance transmission, flexible networking, convenient deployment, and no geographical restrictions, and has been widely applied to a plurality of fields such as maritime communication, positioning and navigation, disaster relief, scientific experiments, video broadcasting, and earth observation.

Figure 1:
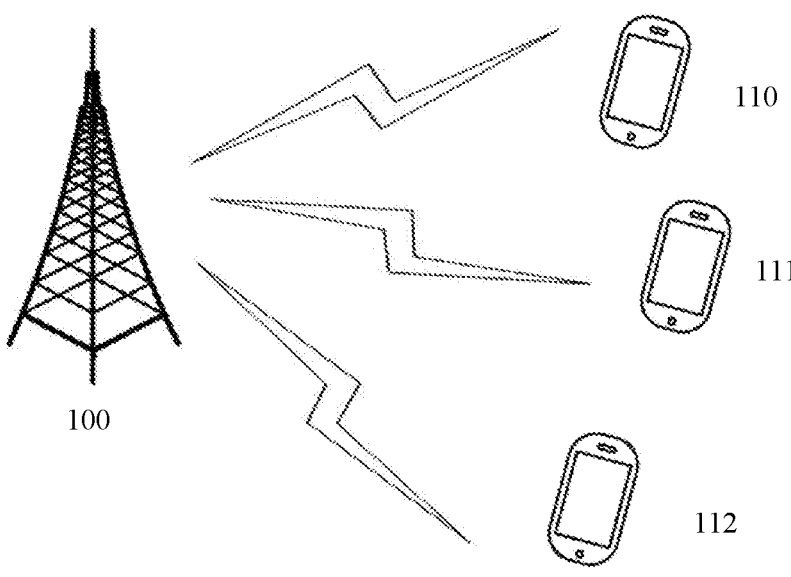
FIG. 1 is a schematic diagram of an architecture of a communication system used in embodiments of this application.

FIG. 1 shows a schematic diagram of a communication system to which the technical solutions provided in the embodiments of this application may be applied. The communication system includes at least one network device (a network device 100 shown in the figure) and one or more terminal devices (a terminal device 110, a terminal device 111, and a terminal device 112 that are shown in the figure) that communicate with the network device. The terminal device 110, the terminal device 111, or the terminal device 112 shown in FIG. 1 may communicate with the network device 100. Quantities of the terminal devices and the network device in FIG. 1 are only an example. This is not limited in the embodiments of this application.

In the communication system, the terminal device may access the network device and communicate with the network device. For example, one network device may manage one or more (for example, three or six) cells, and the terminal device may access the network device in at least one cell of the one or more cells, and communicate with the network device in a cell in which the terminal device is located. In the embodiments of this application, at least one may be one, two, three, or more. This is not limited in the embodiments of this application.

In embodiments of this application, communication between the network device and the terminal device includes: the network device sends a downlink signal/information to the terminal device, and/or the terminal device sends an uplink signal/information to the network device.

In embodiments of this application, "/" may indicate an "or" relationship between associated objects. For example, A/B may represent A or B; and "and/or" may be used to describe three relationships between associated objects. For example, A and/or B may represent the following three cases: Only A exists, both A and B exist, and only B exists. A and B may be singular or plural. In the embodiments of this application, the terms such as "first" and "second" may be used to distinguish between technical features with same or similar functions. Terms such as "first" and "second" do not limit a quantity and an execution sequence, and the terms such as "first" and "second" do not indicate a definite difference. In embodiments of this application, the terms such as "example" or "for example" are used to represent an example, an illustration, or a description, and any embodiment or design solution described as "example" or "for example" should not be construed as more preferred or advantageous than other embodiments or design solutions. The term "example" or "for example" is intended to present a concept in a specific manner for ease of understanding.

The terminal device in the embodiments of this application may also be referred to as a terminal, user equipment (UE), a mobile station, a mobile terminal, or the like. The terminal device may be a mobile phone, a tablet computer, a computer with a wireless transceiver function, a virtual reality (VR) terminal device, an augmented reality (AR) terminal device, a wireless terminal in industrial control, a wireless terminal in self-driving, a wireless terminal in telesurgery, a wireless terminal in a smart grid, a wireless terminal in transportation safety, a wireless terminal in a smart city, a wireless terminal in a smart home, or the like. A specific technology and a specific device form used by the terminal device are not limited in embodiments of this application. In embodiments of this application, an apparatus configured to implement a function of the terminal device may be a terminal device or an apparatus that can support the terminal device to implement the function, for example, a chip system. The apparatus may be disposed in the terminal device or matched with the terminal device for use. In some embodiments, the chip system may include a chip, or may include a chip and another discrete component. In the technical solutions provided in the embodiments of this application, that the apparatus configured to implement the function of the terminal device is a terminal device is used as an example, to describe the technical solutions provided in the embodiments of this application.

The network device in embodiments of this application is an access device through which the terminal device wirelessly accesses the mobile communication system, and may be a base station, an evolved NodeB (eNodeB), a transmission reception point (TRP), a next generation NodeB (gNB) in a 5G mobile communication system, a base station in an NTN communication system, a base station in a future mobile communication system, an access node in a Wi-Fi system, or a module or unit that completes some functions of a base station.

The network device may include a central unit (CU) and a distributed unit (DU). The CU and the DU may be divided based on a protocol layer of a wireless network, for example, functions of a packet data convergence protocol (PDCP) layer and protocol layers above the packet data convergence protocol layer are disposed in the CU, and functions of protocol layers below the PDCP layer (for example, a radio link control (RLC) layer and a media access control (MAC) layer) are disposed in the DU. Signaling generated by the CU may be sent to the terminal device by using the DU, or signaling generated by the terminal device may be sent to the CU by using the DU. The DU may directly encapsulate the signaling by using a protocol layer without parsing the signaling, and then transmit the signaling to the terminal device or the CU. A specific technology and a specific device form used by the network device are not limited in the embodiments of this application. In the embodiments of this application, an apparatus configured to implement a function of the network device may be a network device or an apparatus that can support the network device to implement the function, for example, a chip system. The apparatus may be disposed in the network device or matched with the network device for use. In the embodiments of this application, that the apparatus configured to implement the function of the network device is a network device is used as an example, to describe the technical solutions provided in the embodiments of this application.

Communication between the network device and the terminal device follows a specific protocol layer. For example, a control plane protocol layer may include protocol layers such as a radio resource control (RRC) layer, a PDCP layer, a RLC layer, a MAC layer, and a physical layer; and a user plane protocol layer may include protocol layers such as a PDCP layer, an RLC layer, a MAC layer, and a physical layer. In a possible implementation, there may further be a service data adaptation protocol (SDAP) layer above the PDCP layer.

Figure 2:
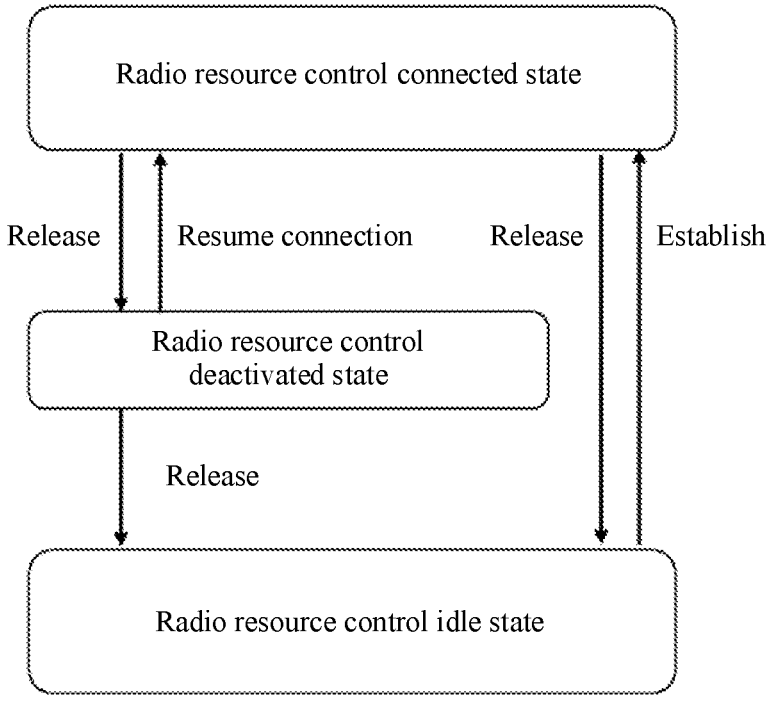
FIG. 2 is a diagram shows status conversion of a radio resource control (RRC)

In embodiments of this application, the terminal device includes three RRC states: a radio resource control connected state (RRC_CONNECTED), a radio resource control deactivated state (RRC_INACTIVE), and a radio resource control idle state (RRC_IDLE). A conversion diagram of the three states is shown in FIG. 2. When the terminal device is in the RRC connected state, the network device may release connection of the terminal device, and configure the terminal device to enter the RRC deactivated state or the RRC idle state. When the terminal device is in the RRC idle state, the terminal device may enter the RRC connected state by establishing an RRC connection to the network device. When the terminal device is in the RRC deactivated state, the terminal device may initiate a request for resuming an RRC connection, and the network device may configure the terminal device to enter the RRC connected state or the RRC idle state.

Mobility management is to ensure that a communication link between the network device and the terminal device is not interrupted by movement of the terminal device. Based on an RRC status of the terminal device, the mobility management may include terminal device idle state mobility management and terminal device connected state mobility management. The mobility management is performed based on mobility measurement.

In the embodiments of this application, the mobility measurement indicates a measurement process or a process of processing a measured result.

In a possible implementation, the terminal device may be in the RRC idle state, the RRC deactivated state, or the RRC connected state. The terminal device receives a message from the network device, where the message includes measurement configuration information. The terminal device performs measurement based on the received measurement configuration information, and selects a cell based on a measurement result. The terminal device performs mobility measurement based on a set of measurement configuration, and low mobility measurement validity is an urgent problem to be resolved.

To resolve the foregoing technical problem, the embodiments of this application provide the following solutions:

1. The network device sends a plurality of sets of measurement configuration information to the terminal device. The terminal device selects one of the plurality of sets of measurement configuration information from the network device for mobility measurement. The terminal device may select one set of measurement configuration information by referring to ephemeris information that is sent by the network device and that is previously stored in the terminal device.

The ephemeris information is valid for a period of time, for example, 3 hours (hrs), after being received by the terminal device. After the ephemeris information is invalid, the terminal device selects one of the plurality of sets of measurement configuration based on a current location and/or a current time for mobility measurement.

2. The network device sends a set of measurement configuration information to the terminal device. The set of measurement configuration information may include frequency information. The terminal device selects some frequencies in the frequency information with reference to the current location and/or the obtained ephemeris information to perform mobility measurement.

In the foregoing solutions, the ephemeris information may include at least one of the following satellite information: a flight track, a networking manner, a ground height, a ground inclination, or a relative location, which is described in detail in subsequent embodiments.

In the foregoing manners, measurement validity of the terminal device is improved, and this helps the terminal device obtain a good service.

The following describes in detail the technical solutions of the embodiments of this application with reference to the accompanying drawings.

Figure 3:
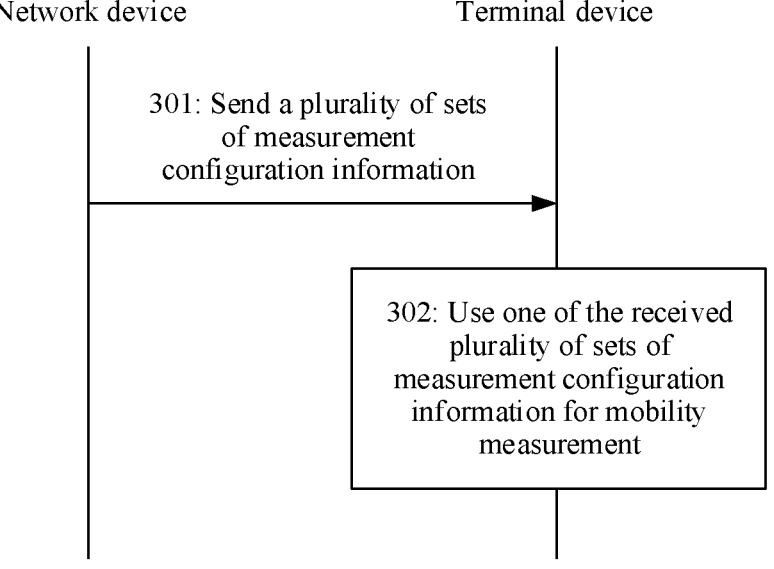
FIG. 3 is a flowchart of mobility measurement according to an embodiment of this application.

FIG. 3 is a flowchart of a mobility measurement method according to an embodiment of this application. As shown in FIG. 3, the mobility measurement method may include S301 and S302.

S301: A network device sends a message to a terminal device.

In some embodiments, the message sent by the network device includes a plurality of sets of measurement configuration information. Optionally, the plurality of sets of measurement configuration information may be explicit. That is, the plurality of sets of measurement configuration information are a plurality of sets of different measurement configuration information, such as measurement configuration information 1, measurement configuration information 2, and measurement configuration information 3. Optionally, the plurality of sets of measurement configuration information may be implicit. That is, the network device sends one set of measurement configuration information, and the measurement configuration information includes a reference value of a measurement configuration parameter, or a reference value of a measurement configuration parameter and a change rule of the measurement configuration parameter. In this case, resources of the network device can be reduced.

In some embodiments, each set of measurement configuration information includes at least one of the following: location information or time information.

In some embodiments, the location information is used to compare with a current location of the terminal device that receives measurement configuration information from the network device to perform mobility measurement. The location information may be represented in a form of an absolute location, for example, global positioning system (GPS) information, a latitude and longitude, and a height. In this case, the location information sent by the network device is an absolute location. For example, the location information is 5° (degrees) north latitude and 3° east longitude. The location information may alternatively be represented by using a relative location, for example, a relative location with a reference point. In this case, the location information sent by the network device includes an absolute location of the reference point and a location relative to the reference point. For example, a piece of location information is 200 m due north of a cell center, and the cell center is 5° north latitude and 3° east longitude. The time information indicates any time information of the terminal device, and may be used to compare with a time location of the terminal device that receives the measurement configuration information from the network device to perform mobility measurement. The time information may be represented in a form of an absolute time, for example, universal time and a system clock. In this case, the time information sent by the network device is an absolute time. For example, the time information is 07:00 Beijing time. The time information may alternatively be represented by a relative time, for example, a period of time after the terminal device receives a message from the network device. In this case, the time information sent by the network device includes an absolute time of a reference time and a time interval from the reference time. For example, if the time information is 5 minutes after the reference time, the reference time is 7:00 Beijing time.

In some embodiments, measurement configuration information of a different set is one of the following cases: Location information is different; time information is different; or both location information and time information are different. For example, measurement configuration information 1 includes location information 1, and time information 1: measurement configuration information 2 includes location information 1, and time information 2: measurement configuration information 3 includes location information 2, and time information 1: measurement configuration information 4 includes location information 2, and time information 2: measurement configuration information 5 includes location information 1: measurement configuration information 6 includes location information 2: measurement configuration information 7 includes time information 1; and measurement configuration 8 includes time information 2.

In some embodiments, each set of measurement configuration information may further include frequency information. It may be understood that because there are a plurality of sets of measurement configuration information, there are a plurality of sets of frequency information. Each set of frequency information indicates a frequency and a priority corresponding to the frequency. In each set of frequency information, a quantity of frequencies is not limited, and types of the frequencies are also not limited. For example, the frequencies may be terrestrial network (TN) frequencies or NTN frequencies.

In some embodiments, the frequency may indicate a frequency band or a center frequency of a frequency band. The frequency band refers to a specific frequency range. For example, if the frequency band is 890.1 MHz to 890.3 MHz, the center frequency of the frequency band is 890.2 MHz. The center frequency may be represented by a number, for example, a corresponding number of 890.2 MHz may be 1. A frequency in the frequency information sent by the network device to the terminal device may be 890.1 MHz to 890.3 MHz, 890.2 MHz, or 1.

In some embodiments, the priority may include the following two information elements: a cell reselection priority, which may be represented by an integer from 0 to 7, where 0 may represent the lowest priority; and a cell reselection sub-priority, which is a fractional value, for example, 0.2, 0.4, 0.6, or 0.8, added to a value of the cell reselection priority. For example, a cell reselection priority of a frequency 1 is 6, and a cell reselection sub-priority is 0.2. In this case, a priority of the frequency 1 is 6.2.

The priority in some embodiments may include the foregoing two information elements. For convenience of writing, the following describes the two information elements as priorities.

In some embodiments, the network device may set a specific value of a priority based on a network deployment, a busy degree of a user, and the like.

In some embodiments, a frequency in a set of frequency information may have no corresponding priority. For example, in a set of frequency information, there is a frequency A. A frequency in a set of frequency information may correspond to a priority. For example, in a set of frequency information, a priority corresponding to a frequency A is 7, and a priority corresponding to a frequency B is 5. One priority may correspond to a plurality of frequencies in a set of frequency information. For example, in a set of frequency information, a priority corresponding to a frequency A is 6, and a priority corresponding to a frequency B is 6.

In some embodiments, priorities of same frequencies of a plurality of sets of frequency information may be different. For example, in frequency information 1, a frequency A corresponds to priority 5, and a frequency B corresponds to priority 3; and in frequency information 2, the frequency A corresponds to priority 6, the frequency B corresponds to priority 3, and a frequency C corresponds to priority 2. Priorities corresponding to different frequencies in a plurality of sets of frequency information may be the same. For example, in the frequency information 1, the frequency A corresponds to priority 5; and in the frequency information 2, the frequency B corresponds to priority 5.

In some embodiments, the frequency information may be associated with the location information. To be specific, for different location information, priorities corresponding to same frequencies may be different. For example, for location information 1, a priority corresponding to a frequency A is 5, and a priority corresponding to a frequency B is 3; and for location information 2, a priority corresponding to the frequency A is 7, and a priority corresponding to the frequency B is 5. For different location information, priorities corresponding to same frequencies may be the same. For example, for the location information 1, the priority corresponding to the frequency A is 5, the priority corresponding to the frequency B is 3, and a priority corresponding to a frequency C is 2; and in the location information 2, the priority corresponding to the frequency A is 7, and the priority corresponding to the frequency B is 3. A plurality of sets of frequency information associated with the location information provide a possibility for the terminal device to select a set of frequency information based on a current location.

In some embodiments, the frequency information may be associated with the time information. To be specific, for different time information, priorities corresponding to same frequencies may be different. For example, for time information 1, a priority corresponding to a frequency A is 5, a priority corresponding to a frequency B is 3, and a priority corresponding to a frequency C is 2: but for time information 2, the priority corresponding to the frequency A is 7, and the priority corresponding to the frequency B is 5. For different time information, priorities corresponding to same frequencies may be the same. For example, for the time information 1, the priority corresponding to the frequency A is 5, and the priority corresponding to the frequency B is 3; and for the time information 2, the priority corresponding to the frequency A is 7, and the priority corresponding to the frequency B is 3. A plurality of sets of frequency information associated with the time information provide a possibility for the terminal device to select a set of frequency information based on a current time.

The plurality of sets of frequency information include a general set of frequency information. When location information associated with frequency information cannot match a current location of the terminal device, or when time information associated with frequency information cannot match a current time of the terminal device, the general frequency information is used for mobility measurement of the terminal device.

In some embodiments, each set of measurement configuration information may further include an offset. It may be understood that because there are a plurality of sets of measurement configuration information, there are a plurality of sets of offsets. The offset is used to correct a result measured by the terminal device. For example, the offset is used to correct a received signal level value measured by the terminal device. The offset includes a cell offset, a frequency offset, and an NTN offset. Different types of offsets can be used to simultaneously correct a same measurement result. The offset may enable the terminal device to select a proper cell to obtain good service quality. If the terminal device is in an RRC connected state, the terminal device may further report the corrected measurement result to the network device.

In some embodiments, the plurality of sets of offsets may be explicit. To be specific, the network device sends a plurality of sets of offsets such as an offset 1, an offset 2, and an offset 3. The plurality of sets of offsets may alternatively be implicit. To be specific, the network device sends a set of reference offset, or a set of reference offset and a change rule of an offset. For example, the network device sends a cell center location offset. For example, the network device sends an offset 1 of a center location of a cell, and the offset is proportional to a distance. The distance is a distance, for example, a European distance, between a current location of the terminal device and the center location of the cell. The network device sends a plurality of sets of implicit offsets, thereby saving resources of the network device.

In some embodiments, the offsets are associated with the location information. That is, different location information may correspond to different offsets. For example, location information 1 corresponds to an offset 1; and location information 2 corresponds to an offset 2. Different location information may correspond to a same offset. For example, the location information 1 corresponds to the offset 1; and the location information 2 corresponds to the offset 1. A plurality of sets of offsets associated with the location information enable the terminal device to select a set of appropriate offsets based on a current location to correct a measurement result.

In some embodiments, the offsets are associated with the time information. That is, different time information may correspond to different offsets. For example, time information 1 corresponds to an offset 1; and time information 2 corresponds to an offset 2. Different time information may correspond to a same offset. For example, the time information 1 corresponds to the offset 1; and the time information 2 corresponds to the offset 1. A plurality of sets of offsets associated with the time information enable the terminal device to select a set of appropriate offsets based on a current time to correct the measurement result.

In some embodiments, the plurality of sets of offsets include one set of general offsets. When the location information cannot match the current location of the terminal device or the time information cannot match the current time of the terminal device, the general measurement configuration information is used for mobility measurement of the terminal device.

In some embodiments, the plurality of sets of measurement configuration information include one set of general measurement configuration information. The general measurement configuration information includes the general frequency information and the general offsets. An application scenario of the general measurement configuration information is the same as an application scenario of the general frequency information or the general offset.

In some embodiments, the measurement configuration information may be included in one of the following messages. Optionally, a system message or an RRC release message sent by the network device includes the measurement configuration information, and is received by the terminal device in an RRC idle state or an RRC deactivated state. Optionally, an RRC reconfiguration message sent by the network device includes the measurement configuration information, and the RRC reconfiguration message is received by the terminal device in an RRC idle state or an RRC deactivated state.

S302: The terminal device uses one of the received plurality of sets of measurement configuration information for mobility measurement.

In some embodiments, the terminal device may select one set of measurement configuration information for mobility measurement based on a current location and/or a current time. The measurement configuration information includes location information and time information.

In some embodiments, each set of measurement configuration information may further include frequency information. It may be understood that because there are a plurality of sets of measurement configuration information, there are a plurality of sets of frequency information. The terminal device may select one set of frequency information based on the current location and/or the current time.

In some embodiments, the terminal device selects, based on a current location, one set of frequency information from a plurality of sets of frequency information that are related to location information and that are received from the network device to perform mobility measurement. The location information corresponding to the frequency information selected by the terminal device matches the current location of the terminal device. The matching refers to that the current location of the terminal device is within a specific range of the location information sent by the network device. For example, when the location information is an absolute location and is 5° north latitude and 8° east longitude, and the current location of the terminal device is within a range of 3° north latitude to 10° north latitude and 2° east longitude to 12° east longitude (optionally, boundary values may be included or not be included), it may be considered that the location information matches the current location of the terminal device. For example, when the location information is a relative location and is 100 m from the cell center, and the current location of the terminal device is within a range of 50 m to 150 m from the cell center (optionally, boundary values may be included or not be included), it may be considered that the location information matches the current location of the terminal device. Optionally, the range may be included in each set of measurement configuration information, and the terminal device receives the measurement configuration information from the network device to obtain the range. This saves resources of the terminal device. Optionally, the range may be preset on a terminal device side, and this saves the resources of the network device.

For example, as shown in Table 1, a current location 1 of the terminal device is covered by a TN frequency. In this case, the terminal device selects the set of frequency information, a priority of a TN frequency A is 7, and a priority of an NTN frequency B is 2 (the following specific frequency and priority values are merely used as examples).

TABLE 1

| Current location of the terminal device | Frequency | Priority |
| --- | --- | --- |
| Location 1 | TN frequency A | 7 |
| | NTN frequency B | 2 |

For example, as described in Table 2, a current location 2 of the terminal device is not covered by the TN frequency. In this case, the terminal device selects the set of frequency information, the priority of the TN frequency A is 0, and the priority of the NTN frequency B is 5. Alternatively, as shown in Table 3, frequency information of the TN frequency A is not included in a message sent by the network device, and the priority of the NTN frequency B is 5.

TABLE 2

| Current location of the terminal device | Frequency | Priority |
| --- | --- | --- |
| Location 2 | TN frequency A | 0 |
| | NTN frequency B | 5 |

TABLE 3

| Current location of the terminal device | Frequency | Priority |
| --- | --- | --- |
| Location 2 | NTN frequency B | 5 |

For example, as shown in Table 4, in at least one of the following scenarios, the terminal device selects general frequency information, the priority of the TN frequency A is 7, and the priority of the NTN frequency B is 2.

TABLE 4

| Current location of the terminal device | Frequency | Priority |
| --- | --- | --- |
| — | TN frequency A | 7 |
| | NTN frequency B | 2 |

The scenarios in which the terminal device selects the general frequency information:
1. There is no location information that matches the current location of the terminal device.
2. The terminal device loses or does not have a positioning function.

In some embodiments, the terminal device receives a plurality of sets of frequency information that are associated with location information and that are from the network device, and the terminal device selects one of the plurality of sets of frequency information from the network device based on the current location for mobility measurement. The terminal device can flexibly select appropriate frequency information for mobility measurement based on a relationship between network deployment and a location. Compared with the conventional technology in which one set of frequency information is always used, there are several advantages such as: energy consumption of the terminal device is reduced and a cell with better quality is quickly measured. This helps obtain a better service. In addition, the terminal device may select a set of general frequency information, so that the method covers more scenarios.

In some embodiments, the terminal device selects, based on a current time, one set of frequency information from a plurality of sets of frequency information that are related to time information and that are received from the network device, to perform mobility measurement. The time information corresponding to the frequency information selected by the terminal device matches the current time of the terminal device. The matching refers to that the current time of the terminal device is within a specific range of the time information sent by the network device. For example, when the time information is an absolute time, namely, 05:00

Beijing time, and the current time of the terminal device is within a range of 05:10 to 5:15 (optionally, boundary values may be included or not be included), it may be considered that the time information matches the current location of the terminal device. For example, when the time information is a relative time, namely, a time 1 when the network device sends a message, and the current time of the terminal device does not exceed 5 minutes relative to the time 1 (optionally, boundary values may be included or not be included), it may be considered that the time information matches the current time of the terminal device. Optionally, the matching range may be included in each set of measurement configuration information, and the terminal device receives the measurement configuration information from the network device to obtain the range. This saves the resources of the terminal device. Optionally, the matching range may be preset on the terminal device side. This helps save the resources of the network device.

For example, as shown in Table 5, a current time 1 of the terminal device is covered by the TN frequency. In this case, the terminal device selects the set of frequency information, the priority of the TN frequency A is 7, and the priority of the NTN frequency B is 2.

TABLE 5

| Current time of the terminal device | Frequency | Priority |
|---|---|---|
| Time 1 | TN frequency A | 7 |
| | NTN frequency B | 2 |

For example, as shown in Table 6, a current time 2 of the terminal device is not covered by the TN frequency. In this case, the terminal device selects the set of frequency information, the priority of the TN frequency A is 0, and the priority of the NTN frequency B is 5. Alternatively, as shown in Table 7, the frequency information of the TN frequency A is not included in a message sent by the network device, and the priority of the NTN frequency B is 5.

TABLE 6

| Current time of the terminal device | Frequency | Priority |
|---|---|---|
| Time 2 | TN frequency A | 0 |
| | NTN frequency B | 5 |

TABLE 7

| Current time of the terminal device | Frequency | Priority |
|---|---|---|
| Time 2 | NTN frequency B | 5 |

For example, as shown in Table 8, in at least one of the following scenarios, the terminal device selects general frequency information, the priority of the TN frequency A is 7, and the priority of the NTN frequency B is 2.

TABLE 8

| Current time of the terminal device | Frequency | Priority |
|---|---|---|
| | TN frequency A | 7 |
| | NTN frequency B | 2 |

The scenarios in which the terminal device selects the general frequency information:

1. There is no time information that matches the current time of the terminal device.
2. The terminal device loses or does not have a clock function.

In some embodiments, the terminal device receives the plurality of sets of frequency information that are related to the time information and that are from the network device. The terminal device selects, based on the current time, one of the plurality of sets of frequency information sent by the network device for mobility measurement. The terminal device can flexibly select appropriate frequency information to perform mobility measurement based on a relationship between network deployment and time. Compared with the conventional technology in which one set of frequency information is always used, there are several advantages such as: energy consumption of the terminal device is reduced and a cell with better quality is quickly measured. This helps obtain a better service. In addition, the terminal device may select a set of general frequency information, so that the method covers more scenarios.

In some embodiments, the frequency information sent by the network device may alternatively be associated with both the location information and the time information. That is, the terminal device may select one set of frequency information based on the current location and the current time. For details, refer to the foregoing embodiments. Details are not described herein again.

In some embodiments, the terminal device may be in an RRC idle state or an RRC deactivated state, and mobility management includes a cell reselection process and a cell selection process. The terminal device reads measurement configuration information from a system message or an RRC release message.

In some embodiments, cell reselection refers to a process in which the terminal device has camped on a first cell and is in an RRC idle state or an RRC inactive state to reselect a second cell to camp on. The frequency information selection performed by the terminal device based on the current location and/or the current time may be applied to a cell reselection scenario.

In some embodiments, after selecting one set of frequency information, the terminal device performs mobility measurement in the following three cases based on priorities:

(1) A priority of the second cell is higher than a priority of the first cell: The terminal device measures the second cell.

(2) The second cell and the first cell have a same frequency (e.g., intra-frequency): if a signal level value of the first cell calculated by the terminal device is less than or equal to an intra-frequency measurement threshold or a system message does not have an intra-frequency measurement threshold, the terminal device measures the second cell. The threshold in some embodiments refers to a threshold of a parameter sent by the network device. For example, the intra-frequency measurement threshold is an intra-frequency measurement threshold sent by the network device.

(3) The priority of the second cell is the same as or lower than the priority of the first cell: If the signal level value of the first cell calculated by the terminal device is less than or equal to an inter-frequency measurement threshold or the system message does not have an inter-frequency measurement threshold, the terminal device measures the second cell.

After performing mobility measurement, the terminal device reselects a cell in the following three cases based on priorities:

(1) The priority of the second cell is higher than the priority of the first cell: during reselection, a signal level value of the second cell calculated by the terminal device is greater than a high-priority reselection threshold of the second cell.

(2) The priority of the second cell is lower than the priority of the first cell: during reselection, the signal level value of the first cell calculated by the terminal device is less than a low-priority reselection threshold of the first cell, and the signal level value of the second cell calculated by the terminal device is greater than a low-priority threshold of the second cell.

(3) The second cell and the first cell have a same priority or a same frequency: based on a signal quality level parameter (Rs) of the first cell and a signal quality level parameter (Rn) of the second cell, the signal quality level parameter of the second cell is greater than the signal quality level parameter of the first cell.

The signal quality level parameter (Rs) of the first cell and the signal quality level parameter (Rn) of the second cell may be separately calculated by using the following formulas:

$$R_S = Q_{meas,s} + Q_{hyst} - Q_{offset}$$

$$R_n = Q_{meas,n} - Q_{offset}$$

$Q_{meas,s}$ is a cell received signal strength value that is measured by the terminal device during cell reselection:

$Q_{hyst}$ is a hysteresis value used to prevent ping-pong reselection; and $Q_{offset}$ is the foregoing offset, and the terminal device corrects a mobility measurement result by using the offset, for example, corrects the measured cell received signal strength value. This enables the terminal device to reselect a cell with good quality of service.

In some embodiments, each set of measurement configuration received by the terminal device from the network device further includes offsets. It may be understood that because there are a plurality of sets of measurement configuration information, there are a plurality of sets of offsets. The terminal device may select one set of offset information based on a current location and/or a current time.

In some embodiments, the plurality of offsets may be explicit. To be specific, the terminal device receives a plurality of sets of offsets such as an offset 1, an offset 2, and an offset 3. The terminal device selects one set of offsets based on the current location and/or the current time, for example, the offset 1, to correct a measurement result. The terminal device selects one set of offsets from the plurality of received offsets, thereby saving the resources of the terminal device. The plurality of sets of offsets may alternatively be implicit. To be specific, the terminal device receives a reference offset, or a reference offset and a change rule of an offset, and the terminal device calculates offsets of the current location and/or the current time based on the reference offset and the change rule (optionally, the change rule is sent by the network device or is preset on the terminal device). For example, the terminal device receives an offset 1 of a center location of a cell and the offset is proportional to a distance. The distance is a physical distance, for example, between a current location of the terminal device and the center location of the cell. The terminal device calculates an offset based on the current location, and corrects a measurement result by using the offset. The network device needs to send only one set of offsets, so that the resources of the network device are saved.

In some embodiments, the offsets are associated with location information. The terminal device selects, based on the current location, one set of offsets from the plurality of sets of received offsets that are associated with the location information, to perform mobility measurement. The location information corresponding to the offsets selected by the terminal device matches the current location of the terminal device. For a meaning of the matching, refer to the foregoing descriptions related to the frequency information. Details are not described herein again.

For example, the terminal device selects, based on a current location 1, the offset 1 to correct the measurement result, and location information corresponding to the offset 1 matches the current location 1 of the terminal device. The terminal device selects, based on a current location 2, the offset 2 to correct the measurement result, and location information corresponding to the offset 2 matches the current location 2 of the terminal device.

In some embodiments, because network deployment is related to a location, the terminal device selects a set of offsets based on the current location. This helps improve rationality of correcting the measurement result by the terminal device, thereby helping the terminal select a cell with a good service.

In some embodiments, the offsets are associated with time information. The terminal device selects, based on the current time, one set of offsets from a plurality of sets of received offsets that are related to the time information to perform mobility measurement. The time information corresponding to the offsets selected by the terminal device matches the current time of the terminal device. For a meaning of the matching, refer to the foregoing description related to the frequency information. Details are not described herein again.

For example, the terminal device selects, based on a current time 1 of the terminal device, the offset 1 to correct the measurement result, and time information corresponding to the offset 1 matches the current location 1 of the terminal device. The terminal device selects, based on a current time 2 of the terminal device, the offset 2 to correct the measurement result, and time information corresponding to the offset 2 matches the current location 2 of the terminal device.

In some embodiments, because network deployment is related to time, the terminal device selects a set of offsets based on the current time. This helps improve rationality of correcting the measurement result by the terminal device, thereby helping the terminal select a cell with a good service.

In some embodiments, the offsets may alternatively be associated with both the location information and the time information. That is, the terminal device may select one set of offsets based on the current location and the current time. For details, refer to the foregoing embodiments. Details are not described herein again.

In some embodiments, the terminal device may further select a set of general offsets. In at least one of the following scenarios, the terminal device selects the general offsets. The location information corresponding to the plurality of sets of offsets does not match the current location of the terminal device: the time information corresponding to the plurality of sets of offsets does not match the current time of the terminal device: the terminal device loses or does not have a positioning function; or the terminal device loses or does not have a clock function.

According to some embodiments, during cell reselection, the terminal device selects a set of measurement results based on a current location and/or a current time to correct the offset, thereby improving rationality of correcting the measurement result by the terminal device, and helping the terminal device reselect a cell with a good service.

In some embodiments, cell selection refers to a process in which the terminal device is powered on or enters a coverage area from a blind area to select an appropriate cell to camp on. The foregoing mobility measurement method is also applicable to a cell selection scenario.

In some embodiments, the terminal device in an RRC inactive state or an RRC idle state receives one of the plurality of sets of measurement configuration information from the network device for mobility measurement. This helps improve validity of mobility measurement and the terminal device can select a cell with a good service.

In some embodiments, the terminal device may be in an RRC connected state. A purpose of mobility measurement performed by the terminal device in the RRC connected state is to report the measurement result to the network device, and the network device makes decisions such as cell handover based on the received measurement result from the terminal device. The terminal device receives measurement configuration information carried in an RRC reset configuration message from the network device.

In some embodiments, the terminal device may be in an RRC connected state. In this scenario, the plurality of sets of measurement configuration information further include a report configuration. The report configuration includes a trigger type, a trigger amount, a reporting condition, a reporting amount, a reporting interval, and a quantity of reporting times. The trigger type of the report configuration includes event trigger reporting and periodic reporting. The event trigger reporting means that the terminal device needs to evaluate a measurement result based on the reporting condition in the report configuration, and report a network device measurement report if the reporting condition is met. The periodic reporting means that the terminal device does not need to evaluate the measurement result. After receiving the report configuration of the network device, the terminal device periodically reports the measurement result to the network device based on a reporting period and a quantity of times indicated by the report configuration. The trigger amount indicates whether reference signal received power is triggered or reference signal received quality is triggered. The reporting amount indicates whether to report the trigger amount or report both the reference signal received power and the reference signal received quality during reporting. The quantity of reporting times indicates a quantity of times that the terminal device needs to report.

In some embodiments, the terminal device in the RRC connected state selects a set of measurement configuration parameters based on a current location and/or a current time to perform mobility measurement. Referring to the foregoing scenario in which the terminal device is in the RRC deactivated state or the RRC idle state, and details are not described herein again. The terminal device records the measurement result, and reports the measurement result to the network device based on the report configuration received from the network device. The network device may make a decision based on the received measurement report.

In some embodiments, the network device sends a plurality of sets of measurement configuration information, and the terminal device selects, based on the current location and/or the current time, one of the plurality of sets of measurement configuration information sent by the network device for mobility measurement. The terminal device can flexibly select a more appropriate measurement configuration for mobility based on a network deployment. Compared with the conventional technology in which one set of frequency information is always used, advantages are obvious. Validity of mobility measurement is improved, and this helps the terminal device obtain a good service. Gains can be obtained in mobility measurement of the terminal device in the RRC idle state, the RRC deactivated state, and the RRC connected state.

An embodiment of this application further provides a mobility measurement method, and the method includes the following steps:

A terminal device receives measurement configuration information from a network device, where the measurement configuration information includes a plurality of pieces of frequency information; and the terminal device performs, based on a current location and/or ephemeris information, mobility measurement on some frequencies indicated by the plurality of pieces of frequency information.

For terms, explanations, application scenarios, or the like in some embodiments, refer to the descriptions in the foregoing embodiments. Details are not described herein again.

Differently than the foregoing embodiments, a quantity of measurement configuration information in this embodiment is one set. For the network device, measurement configuration information sent by the network device to the terminal device is not differentiated. In other words, the measurement configuration information may include all configuration information that the network device expects the terminal device to measure. With reference to a situation of the terminal device or obtained information, the terminal device may determine a measurement object, a measurement type, a measurement quantity, and/or a measurement manner.

A quantity of frequencies and/or frequency types that may be included in or indicated by the frequency information are not limited. For example, the frequency type may include a TN frequency or a NTN frequency. The frequency may indicate a frequency band, a center frequency of the frequency band, or a number of the center frequency.

A current location of a terminal may be understood as a geographical location in which the terminal is located or a location range in which the terminal moves within a period of time after the terminal receives measurement configuration information. The time may be predefined, broadcast by a system, or obtained by using dedicated signaling. This is not limited in this embodiment of the this application. Alternatively, the terminal may determine a location at a specific time point or in a specific time period as a current location.

For example, a networking manner in the ephemeris information is an association relationship between satellites, for example, a distance and/or an angle, a ground height is an absolute height and/or a relative height of a satellite relative to the ground, a ground inclination angle is an inclination angle of a satellite relative to the ground, and a relative location is a current location of a satellite or an expected location after a period of time.

In some embodiments, that the terminal device selects some frequencies for measurement may include one or more of the following manners:

When a frequency in the frequency information meets the current location and/or the ephemeris information, the terminal device measures the frequency; or when a frequency in the frequency information does not meet the current location and/or the ephemeris information, the terminal device gives up measuring the frequency.

When the terminal device determines, based on the current location and/or the ephemeris information, that the frequency can be measured at a current moment, the terminal device measures the frequency; or when the terminal device determines, based on the current location and/or the ephemeris information, that the frequency cannot be measured at a current moment, the terminal device gives up measuring the frequency.

Further, the network device may send location information of a TN frequency to the terminal device. For example, the location information may indicate an absolute location or a geographic location in a geographical range, for example, longitude and latitude information, may indicate a relative location, for example, a distance or length from a reference point, and may also indicate a virtual cell, for example, within a range of a specific or several virtual cells. According to the indication manners, the terminal device may improve validity and a success rate of screening a frequency.

In some embodiments, the ephemeris information or location information may be predefined, broadcast by a system, or obtained by using dedicated signaling. This is not limited in this embodiment of the present disclosure.

In some embodiments, the terminal device may flexibly select an appropriate measurement configuration based on a network deployment, to improve mobility measurement validity and provide high-quality service.

It may be understood that, to implement the functions in the foregoing embodiments, the network device and the terminal device include corresponding hardware structures and/or software modules for executing the functions. A person skilled in the art should easily be aware that, in combination with the units and the method steps in the examples described in embodiments disclosed in this application, this application can be implemented by hardware, software, or a combination of hardware and software. Whether a function is performed by hardware, software, or hardware driven by computer software depends on particular application scenarios and design constraints of the technical solutions.

Corresponding to the method provided in the foregoing method embodiments, an embodiment of this application further provides a corresponding apparatus, including a corresponding module configured to implement the foregoing embodiments. The module may be software, hardware, or a combination of software and hardware.

Figure 4:
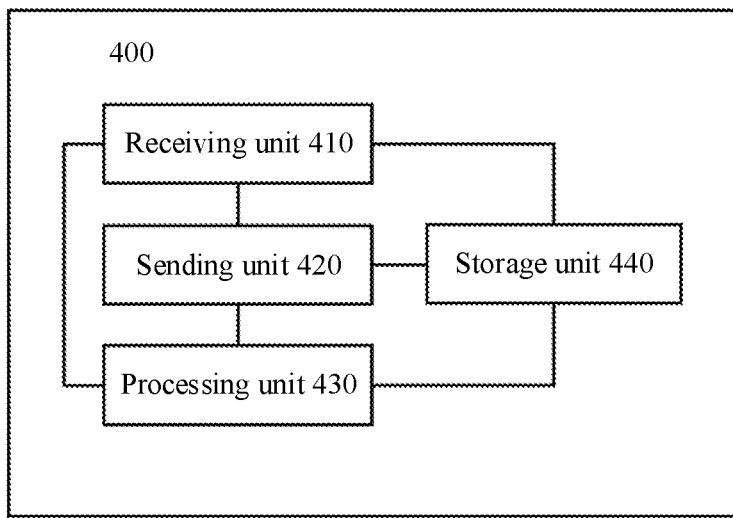
FIG. 4 is a schematic diagram of a structure of a possible communication apparatus according to an embodiment of this application.
Figure 5:
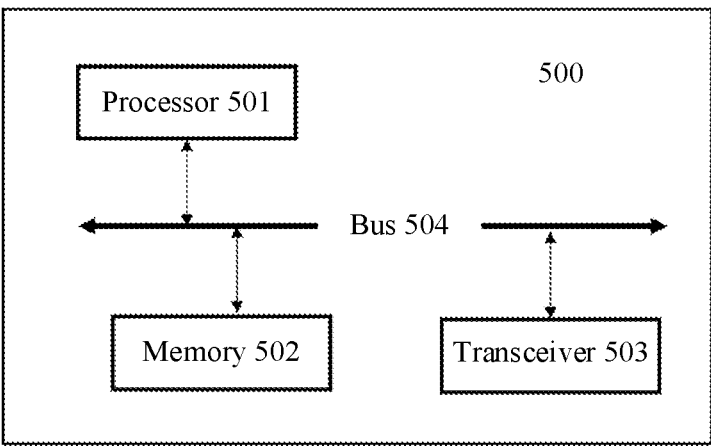
FIG. 5 is a schematic diagram of a structure of a possible communication apparatus according to an embodiment of this application.

The following describes in detail the apparatus provided in some embodiments with reference to FIG. 4 and FIG. 5. It should be understood that the description of the apparatus embodiment corresponds to the description of the method embodiment. Therefore, for content that is not described in detail, refer to the foregoing method embodiments. For brevity, some content is not described again.

FIG. 4 shows a communication apparatus 400 according to an embodiment of this application. The communication apparatus 400 may be the terminal device mentioned in the foregoing embodiments or an apparatus that supports the terminal device to implement the foregoing method, or the communication apparatus 400 may be the network device mentioned in the foregoing embodiments or an apparatus that supports the network device to implement the foregoing method. The communication apparatus 400 includes at least one sending unit (e.g., sending circuit) 420, a receiving unit 410 (e.g., receiving circuit), and a processing unit 430 (e.g., processing circuit).

In a possible design, the communication apparatus 400 may implement corresponding operations of the terminal device in the foregoing methods, and the communication device 400 may include a unit (e.g., a circuit) configured to perform the method performed by the terminal device in the foregoing method. In addition, units (e.g., circuits, sub-circuits) in the communication apparatus 400 and other operations and/or functions are respectively intended to implement corresponding procedures of the foregoing method.

For example, the communication apparatus 400 includes: the receiving unit 410, configured to receive a message from the network device, where the message includes one or more sets of measurement configuration information; and the sending unit 420 (optional), configured to send a measurement report to the network device when the terminal device is in an RRC connected state scenario. The communication apparatus 400 may further include the processing unit 430, configured to process received information, and/or configured to generate information to be sent.

In a possible design, the communication apparatus 400 may implement corresponding operations of the network device in the foregoing methods, and the communication apparatus 400 may include a unit configured to perform the method performed by the network device in the foregoing method. In addition, units in the communication apparatus 400 and other operations and/or functions are respectively intended to implement corresponding procedures of the foregoing method.

For example, the communication apparatus 400 includes a sending unit 420, configured to send a message to the terminal device, where the message includes one or more sets of measurement configuration information. Optionally, the communication apparatus 400 includes a receiving unit 410, configured to receive a measurement report of the terminal device in an RRC connected state. Optionally, the communication apparatus 400 includes a processing unit 430, configured to decide based on the measurement report of the terminal device in the RRC connected state.

Optionally, corresponding to the foregoing possible designs, the communication apparatus 400 may further include a storage unit 440 (e.g., storage circuit). The storage unit 440) may be configured to store other information such as computer-executable instructions and/or data. The processing unit 430 may read the instructions or the data stored in the storage unit 440 to implement a corresponding solution.

In a possible design, the processing unit 430 may be a processor, for example, a processor 501 shown in FIG. 5. The sending unit 420 and the receiving unit 410 may alternatively be a transceiver, for example, a transceiver 503 shown in FIG. 5. Alternatively, the sending unit 420 and the receiving unit 410 may be a communication interface, a circuit, or another apparatus that can implement a transceiver function. The storage unit 440 may be a memory, for example, a memory 502 shown in FIG. 5.

Based on a same technical concept, an embodiment of this application further provides a communication apparatus, configured to implement functions executed by the terminal device and the network device in the foregoing method embodiments. FIG. 5 shows a schematic block diagram of a possible communication apparatus 500 according to an embodiment of this application. The communication apparatus includes at least one processor 501 and a memory 502. Optionally, the communication apparatus includes a transceiver 503 and a system bus 504. The bus 504 may be a PCI bus or an EISA bus, and the bus may be classified into an address bus, a data bus, a control bus, or the like. For ease of representation, only one thick line is used for representation in FIG. 5, but this does not mean that there is only one bus or only one type of bus. The transceiver 503 is configured to perform communication interaction between the communication apparatus 500 and another communication device (for example, a radio access network device or a terminal device, which is not limited herein), for example, exchange control signaling and/or service data. The transceiver 503 may be implemented by using a circuit, a communication interface, or the like that has a communication transceiver function. The memory 502 is configured to store required program instructions and/or data. When the at least one processor invokes and executes the program instructions stored in the memory, the communication apparatus is enabled to implement the function of the terminal device in the foregoing method, or when the at least one processor invokes and executes the program instructions stored in the memory, the communication apparatus is enabled to implement the function of the network device in the foregoing method. The at least one processor 501, the memory 502, and the transceiver 503 are coupled by using the system bus 504.

In the embodiments of this application, when there is no logical contradiction, the embodiments may be mutually referenced. For example, the method and/or the terms between the method embodiments may be mutually referenced. For example, the functions and/or the terms between the apparatus embodiments may be mutually referenced. For example, the functions and/or the terms between the apparatus embodiments and the method embodiments may be mutually referenced.

The processor and the transceiver described in the embodiments of this application may be implemented in an integrated circuit (IC), an analog IC, a radio frequency integrated circuit RFIC, a mixed signal IC, an application specific integrated circuit (ASIC), a printed circuit board (PCB), an electronic device, or the like. The processor and the transceiver may also be fabricated by using various IC process technologies, such as a complementary metal oxide semiconductor (CMOS), an n-type metal-oxide-semiconductor (nMetal-Oxide-Semiconductor. NMOS), a p-type metal-oxide-semiconductor (pMetal-Oxide-Semiconductor. PMOS), a bipolar junction transistor (BJT), a bipolar CMOS (BiCMOS), silicon germanium (SiGe), and gallium arsenide (GaAs). Optionally, the processor may include one or more processors, for example, includes one or more central processing units (CPUs). In a case in which the processor is a CPU, the CPU may be a single-core CPU, or may be a multi-core CPU. The transceiver is configured to send and receive data and/or a signal, and receive data and/or a signal. The transceiver may include a transmitter and a receiver. The transmitter is configured to send data and/or a signal, the receiver is configured to receive data and/or a signal, and the transceiver may also be a communication interface. The memory includes but is not limited to a random access memory (RAM), a read-only memory (ROM), an erasable programmable read-only memory (EPROM), and a compact disc read-only memory (CD-ROM), and the memory is configured to store a related instructions and/or data.

It may be understood by a person skilled in the art that various numbers such as first and second in this application are merely distinctions for convenience of description, and are not intended to limit the scope of the embodiments of this application. A specific value of a number (which may also be referred to as an index), a specific value of a quantity, and a location in this application are merely used as examples, are not unique representation forms, and are not used to limit the scope of the embodiments of this application. Various numbers such as first and second in this application are also merely distinctions for convenience of description, and are not intended to limit the scope of the embodiments of this application.

In this application, elements represented in singular forms are intended to represent "one or more", not "one and only one", unless otherwise noted. In this application, unless otherwise specified, "at least one" is intended to represent "one or more", and "a plurality of" is intended to represent "two or more".

The term "at least one of . . . " or "at least one type of" represents all or any combination of listed items. For example, "at least one of A, B, and C" may represent the following six cases: Only A exists, only B exists, only C exists, both A and B exist, both B and C exist, and A, B and C all exist, where A may be singular or plural, B may be singular or plural, and C may be singular or plural.

A person of ordinary skill in the art may be aware that the units and algorithm steps in the examples described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In several embodiments provided in this application, it should be understood that the disclosed system, apparatus, and method may be implemented in another manner. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

All or some of the methods in embodiments of this application may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, the procedure or functions according to embodiments of the present disclosure are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A mobility measurement method, comprising:
receiving, by a terminal device, a message from a network device, wherein the message comprises a plurality of sets of measurement configuration information, wherein each of the plurality of sets of measurement configuration information comprises frequency information, and the frequency information in each set of measurement configuration information indicates a frequency and a priority corresponding to the frequency;
selecting, by the terminal device, one of the plurality of sets of measurement configuration information for mobility measurement based on at least one of the following:
a current location of the terminal device; or
a current time of the terminal device; and
performing the mobility measurement based on the selected set of measurement configuration information;
wherein each of the plurality of sets of measurement configuration information comprises at least one of the following parameters:
location information; or
time information, wherein
the location information is used to compare with the current location of the terminal device; and
the time information is used to compare with the current time of the terminal device;
wherein the plurality of sets of measurement configuration information comprises one set of general measurement configuration information; and
the method further comprises:
when the location information cannot match the current location of the terminal device or the time information cannot match the current time of the terminal device, performing, by the terminal device, the mobility measurement based on the general measurement configuration information.

2. The method according to claim 1, wherein: the location information of the measurement configuration information used for the mobility measurement matches the current location of the terminal device; or the time information of the measurement configuration information used for the mobility measurement matches the current time of the terminal device.

3. The method according to claim 1, wherein:
each of the plurality of sets of measurement configuration information further comprises an offset; and
the method further comprises:
correcting, by the terminal device, a mobility measurement result based on the offset.

4. A network device, comprising:
at least one processor; and
a memory communicatively coupled to the at least one processor and configured to store executable instructions for execution by the at least one processor to instruct the at least one processor to:
send a message to a terminal device, wherein the message comprises a plurality of sets of measurement configuration information, and each of the plurality of sets of measurement configuration information comprises frequency information, and the frequency information in each set of measurement configuration information indicates a frequency and a priority corresponding to the frequency, and wherein one of the plurality of sets of measurement configuration information is selected for mobility measurement of the terminal device;
wherein each of the plurality of sets of measurement configuration information comprises at least one of the following parameters:
location information; or
time information, wherein:
the location information is used to compare with the current location of the terminal device; and
the time information is used to compare with the current time of the terminal device;
wherein the plurality of sets of measurement configuration information comprises one set of general measurement configuration information; and
when the location information cannot match the current location of the terminal device or the time information cannot match the current time of the terminal device, performing, by the terminal device, the mobility measurement based on the general measurement configuration information.

5. The method according to claim 4, wherein: the location information of the measurement configuration information used for the mobility measurement matches the current location of the terminal device; or the time information of the measurement configuration information used for the mobility measurement matches the current time of the terminal device.

6. The method according to claim 4, wherein
each of the plurality of sets of measurement configuration information further comprises an offset, and the offset is used to correct a mobility measurement result of the terminal device.

7. A mobility measurement apparatus, comprising:
at least one processor; and
a memory communicatively coupled to the at least one processor and configured to store executable instructions for execution by the at least one processor to instruct the at least one processor to:
receive a message from a network device, wherein the message comprises a plurality of sets of measurement configuration information, wherein each of the plurality of sets of measurement configuration information comprises frequency information, and the frequency information in each set of measurement configuration information indicates a frequency and a priority corresponding to the frequency;

select one of the plurality of sets of measurement configuration information for mobility measurement based on at least one of the following:

a current location of the apparatus; or a current time of the apparatus; and perform the mobility measurement based on the selected set of measurement configuration;

wherein each of the plurality of sets of measurement configuration information comprises at least one of the following parameters;

location information; or time information, wherein:

the location information is used to compare with the current location of the apparatus; and the time information is used to compare with the current time of the apparatus;

wherein the plurality of sets of measurement configuration information comprises one set of general measurement configuration information; and the executable instructions further instruct the at least one processor to:

when the location information cannot match the current location of the apparatus or the time information cannot match the current time of the apparatus, performing, by the apparatus, the mobility measurement based on the general measurement configuration information.

8. The apparatus according to claim 7, wherein: the location information of the measurement configuration information used for the mobility measurement matches the current location of the apparatus; or the time information of the measurement configuration information used for the mobility measurement matches the current time of the apparatus.

9. The apparatus according to claim 7, wherein:

each of the plurality of sets of measurement configuration information further comprises an offset; and the executable instructions further instruct the at least one processor to:

correct a mobility measurement result based on the offset.

10. A non-transitory computer-readable storage medium, comprising computer instructions, wherein when the computer instructions are run on an electronic device, the electronic device is enabled to perform the operations of claim 1.

11. A non-transitory computer-readable storage medium, comprising computer instructions, wherein when the computer instructions are run on an electronic device, the electronic device is enabled to perform the operations of claim 4.

12. A non-transitory computer-readable storage medium, comprising computer instructions, wherein when the computer instructions are run on an electronic device, the electronic device is enabled to perform the operations of claim 7.

* * * * *